United States Patent [19]

Heesch et al.

[11] Patent Number: 4,685,729
[45] Date of Patent: Aug. 11, 1987

[54] RETRACTABLE CONSOLE FOR AN AUTOMOTIVE VEHICLE SEAT

[75] Inventors: Max O. Heesch, Brooklyn, Mich.; Vincent Russo, Cary, N.C.

[73] Assignee: ITT Corporation, New York, N.Y.

[21] Appl. No.: 908,622

[22] Filed: Sep. 18, 1986

[51] Int. Cl.$^4$ .................................................. A47C 7/62
[52] U.S. Cl. .................... 297/193; 296/65 R; 296/37.15; 297/113
[58] Field of Search ............. 297/193, 112, 113, 232, 297/237, 233, 257, 217; 296/65 R, 37.14, 37.15, 69

[56] References Cited

U.S. PATENT DOCUMENTS 1,356,558 10/1920 Purcell .................................. 297/193
1,890,048 12/1932 Flintermann ...................... 297/193 X
3,336,077 8/1967 Radke et al. ....................... 297/193

Primary Examiner—James T. McCall
Attorney, Agent, or Firm—James B. Raden; Donald J. Breh

[57] ABSTRACT

A combination second passengers seat and console is disclosed including a hollow seat frame mounted between a primary passengers seat and a drivers seat for movement with the drivers seat and a compartmentalized compartment frame mounted for selective movement to an extended position whereat a console is formed and a retracted position within the seat frame whereat the second passengers seat is formed. A track and an operator controlled reversible motor driven lead screw provides for selective extension and retraction of the compartment frame.

11 Claims, 7 Drawing Figures

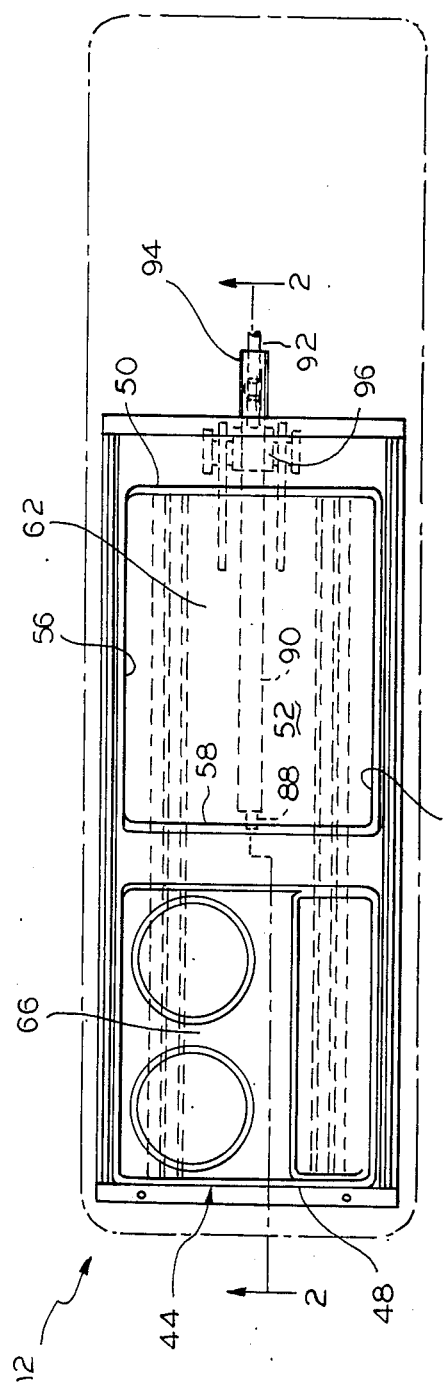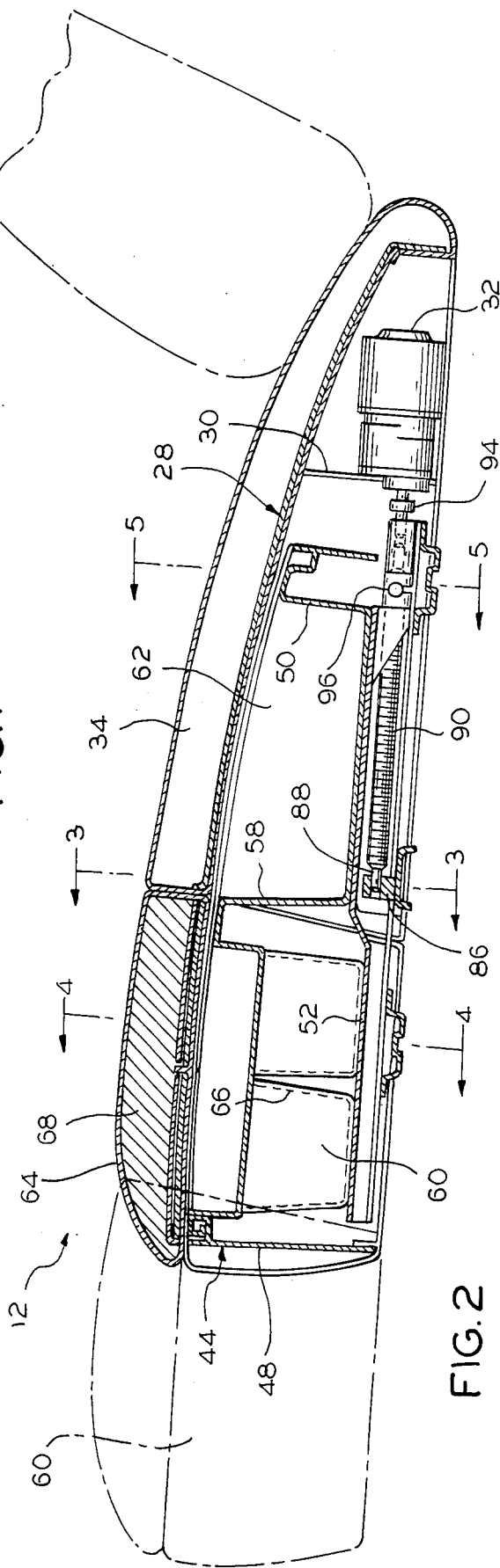

4,685,729

RETRACTABLE CONSOLE FOR AN AUTOMOTIVE VEHICLE SEAT

BACKGROUND FOR THE INVENTION

This invention relates to a console for use in an automotive vehicle front seating arrangement. More particularly, the invention relates to a console which is selectively convertible between a compartmentalized console extending from the front seat toward the vehicle dashboard and a second passenger seat positioned between the drivers seat and the primary passengers seat.

Heretofore, a second passenger front seat has required either a continuous bench type seat extending across the entire width of the vehicle or a split type seat wherein the two passenger seat portions form one continuous portion of the split seat arrangement. In both of these seating arrangements it is not possible to provide for a functional console of the type that is typically positioned between the drivers seat and the primary passengers seat and which extends forward toward the dashboard of the vehicle. Further, when the second passenger center seat position is unoccupied, it would be desirable from both a functional and convenience standpoint as well as for aesthetic reasons to be able to provide for such a console in place of the unoccupied center seat.

SUMMARY OF THE INVENTION

Therefore, it is the primary object of the present invention to provide for a console for use with a drivers and a primary passengers seat which selectively forms either a center second passenger seat or a functional console between the driver and primary passenger seats extending forwardly toward the dashboard of the vehicle.

According to the invention, there is provided a substantially hollow seat fame mounted between the driver and primary passenger seats. The seat frame is mounted for movement with the drivers seat including, for example, forward, rearward, up, down as well as tilting movement. The seat frame has the same shape as the drivers and passengers seat and is contiguous with the adjacent driver and primary passenger seats when those seats are positioned in the same orientation. A console compartment frame is mounted forward of the seat frame with the top surface of a forward portion of the compartment frame forming with the top surface of the seat frame the bottom of a second passengers seat when abutted together.

According to the invention, a second rear portion of the compartment frame is slidably positionable within the interior of the seat frame in a retracted position of the compartment frame.

According to another feature of the invention, the compartment frame is selectively slidable forwardly from the seat frame into an extended position whereat the second rear compartment portion is removed from the interior of the seat frame and is positioned between the first forward compartment portion and the forward end of the seat frame whereby a console having at least two compartments positioned between the seat and dashboard of the vehicle is formed.

According to a still further important feature of the invention, there is provided an operator controlled reversible motor driven lead screw attached to a track associated with the compartment frame providing for the selective slidable extension and retraction of the compartment frame relative to the seat frame.

BRIEF DESCRIPTION OF THE DRAWINGS

The invention will be better understood after a reading of the following Detailed Description Of The Preferred Embodiment in conjunction with the drawings in which:

FIG. 1 is a top view of the console with the top cover removed showing details of construction and operation;

FIG. 2 is a vertical cross sectional view taken along the line 2—2 of FIG. 1 showing details of construction and operation of the console;

DETAILED DESCRIPTION

Figure 4:
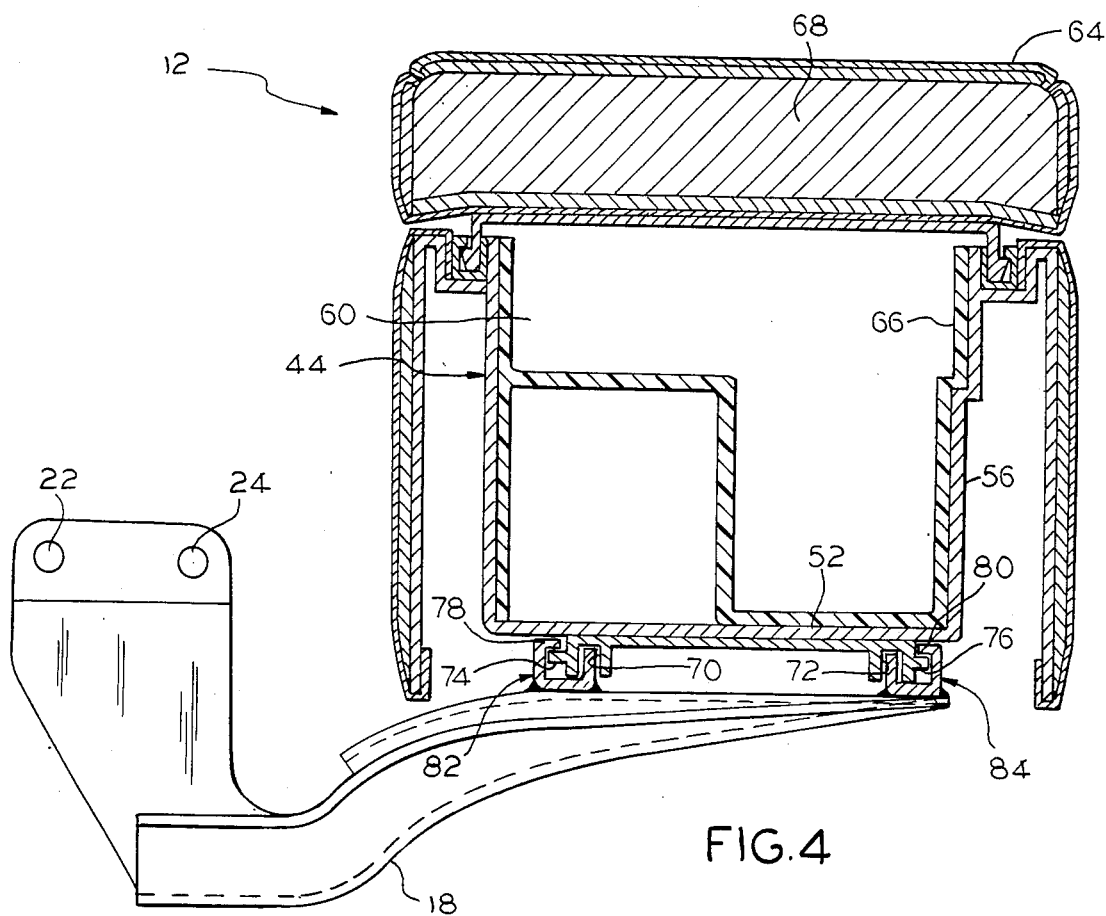
FIG. 4 is a transverse cross sectional view taken along the line 4—4 of FIG. 2 showing details of construction of the front compartment portion of the compartment frame.
Figure 5:
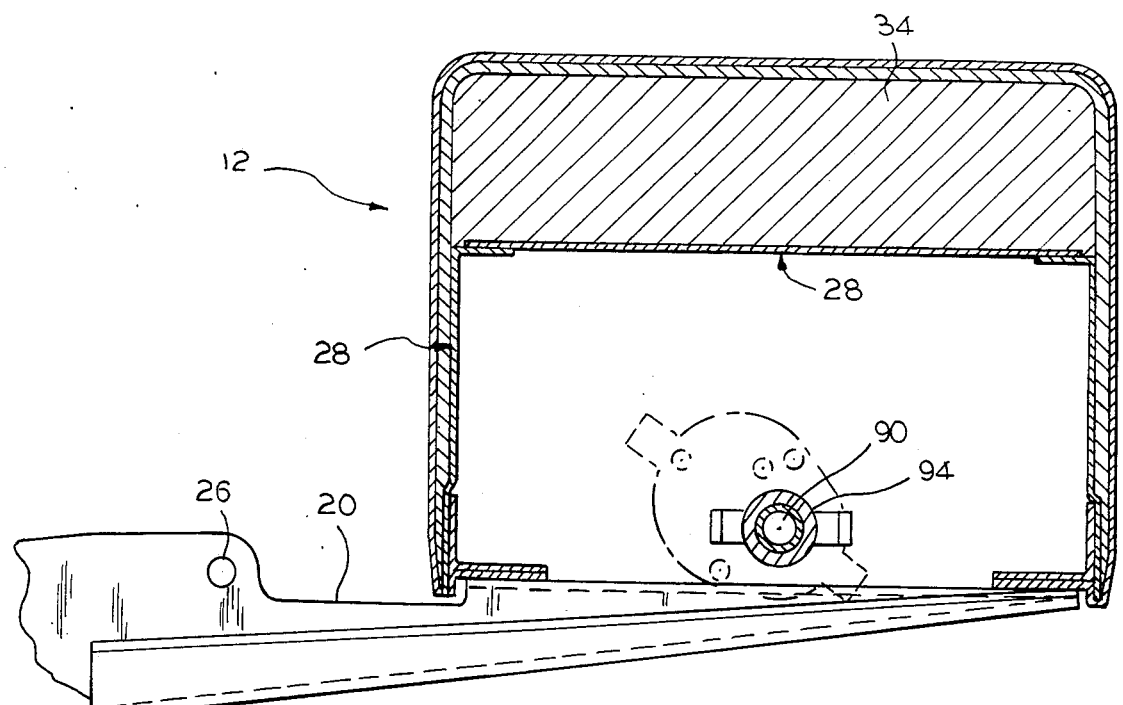
FIG. 5 is a transverse cross sectional view taken along the line 5—5 of FIG. 2 showing further details of construction of the seat frame, rear compartment portion and the compartment frame drive structure.
Figure 6:
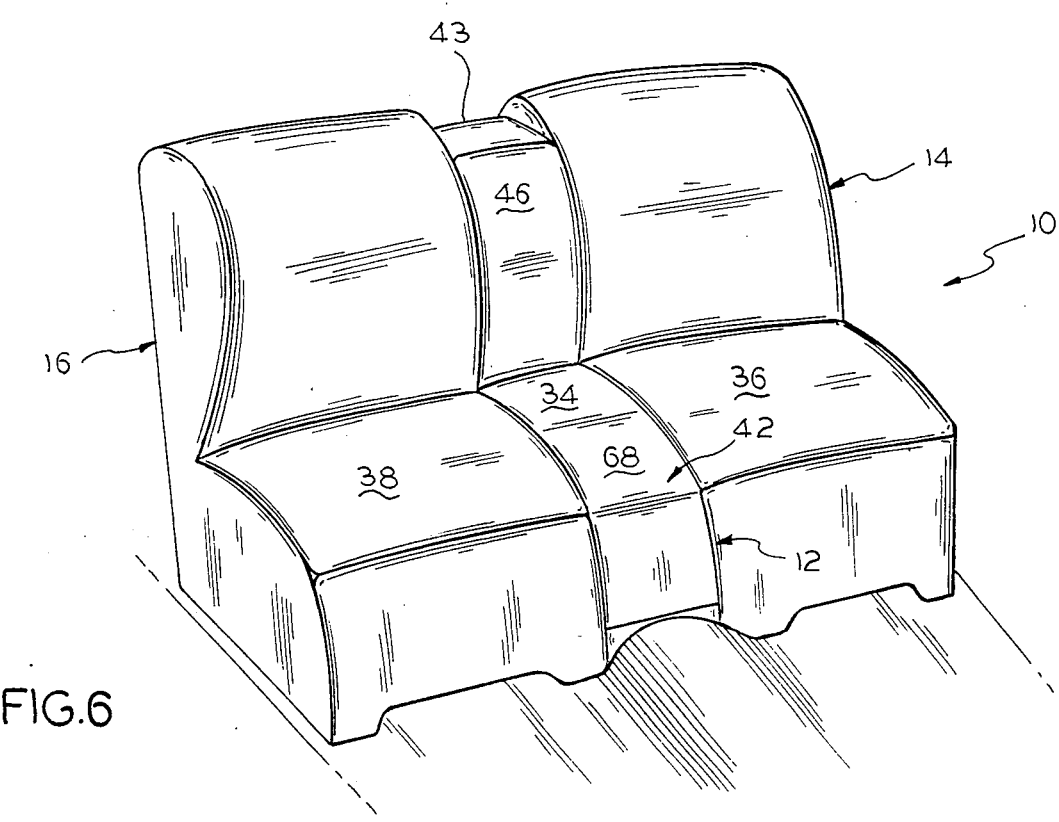
FIG. 6 is a pictorial view of a vehicle front seat arrangement showing the compartment frame in the retracted position forming a second passengers seat between the drivers seat and primary passengers seat.
Figure 7:
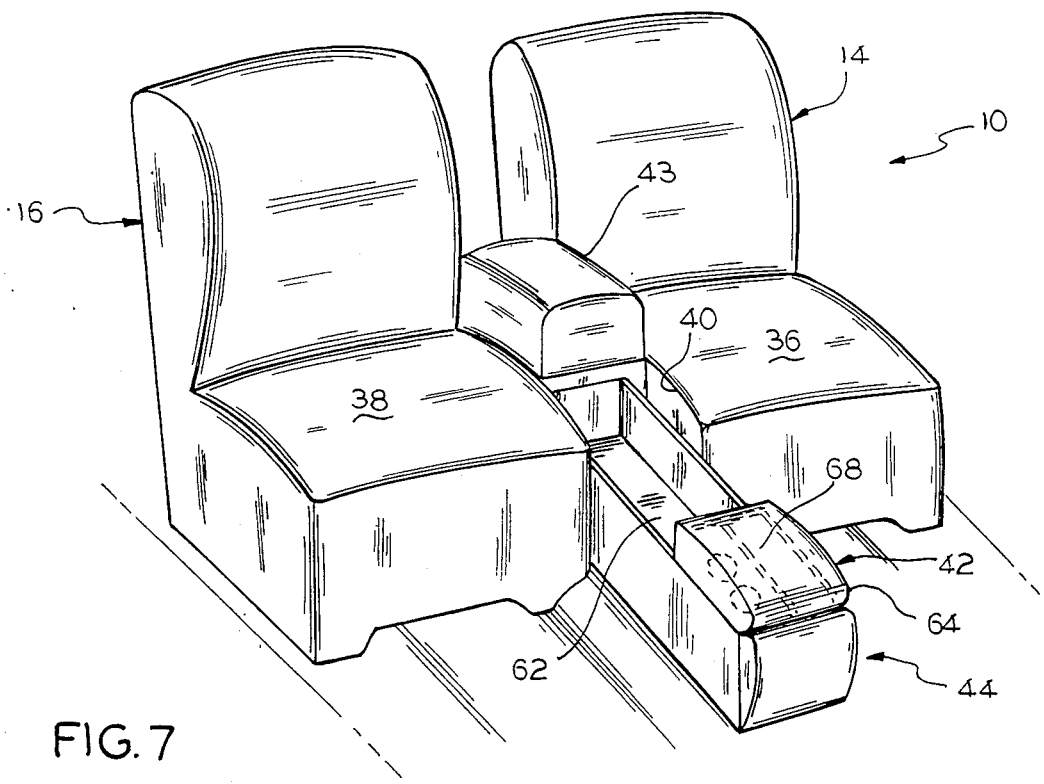
FIG. 7 is a pictorial view of the seating arrangement of FIG. 6 showing the compartment frame in the fully extended position forming a functional console between and extending forwardly along the vehicle floor from the drivers seat and primary passengers seat.

Shown in FIG. 7 is a vehicle front seating arragment 10 including a console 12 which is mounted between a drivers seat 14 and a primary passengers seat 16 and, as shown in FIGS. 4 and 5, the console 12 is mounted for movement with the drivers seat 14 by way of brackets 18, 20 which are provided with holes 22, 24, 26 for receiving bolts, not shown, which are attached to the frame of the drivers seat. By affixing the console to the drivers seat, the console moves with the drivers seat, such as for example, when the drivers seat is moved forward and rearward, up and down or tilted and thereby always remains at the same location relative to the drivers seat. The primary passengers seat 16 can be mounted for movement with the drivers seat and console, but typically it is mounted for independent movement. However, as described below, when the console is positioned to function as a second, center, passenger seat, as shown in in FIG. 6, the primary passengers seat 16 would be positioned to assume the same orientation relative to the console 12 and the drivers seat 14 so as to form a continuous bench type seat across the width of the vehicle.

Referring to FIGS. 1 and 2 the console 12 includes first frame means including a seat frame 28 of either stamped or welded metal construction and forms a hollow enclosure open at its front end (the left end as viewed in FIG. 2). The seat frame 28 is provided with a transverse wall 30 to which a reversible electric motor 32 is mounted. As shown in FIGS. 2, and 6, the first frame means further includes an upholstered padded cover 34 on the top of the seat frame 28 which forms a top surface configured to be complimentary in shape and contiguous with the configuration of the adjacent driver and primary passenger seat bottom cushions 36, 38. The front to rear length of the seat frame 28 is less than the front to rear length of the drivers and passengers seat bottoms 36, 38 leaving a gap 40, shown in the pictorial view of FIG. 7. The gap 40 is filled by a forward portion 42 of a second frame means which includes a slidable compartment frame 44 and an access cover 64 at the forward portion 42 described hereinbelow when positioned in a retracted position as shown in FIG. 6.

As set out below, when the compartment frame 44 is retracted, as shown in FIG. 6, a second passengers seat is defined by the portions 34 and 42 which substantially conform to the shape of and are substantially contiguous with the drivers and primary passengers seat bottoms 36, 38. Preferrably, a typical pivotable arm rest 43, as shown in FIGS. 6 and 7, is provided for which, in an up position as shown in FIG. 6, forms the back 46 of the second passengers seat, and in the down position, as shown in FIG. 7, forms an arm rest for the driver and primary passenger.

The compartment frame 44 is an elongated cast, stamped or build up member having a front wall 48, a rear wall 50, a bottom 52 and opposing sides 54, 56. The compartment frame is open at its top and further includes a transverse partition 58 dividing the frame into a forward compartment 60 and a rear compartment 62. As shown in FIGS. 2 and 4, the compartment frame is provided with an access cover 64 at the forward portion 42 over the forward compartment 60. The forward compartment can be provided with an insert 66 received in the open portion of the frame which insert is configured into any desired shape, for example for holding cups and the tray-like portion shown in FIGS. 1 and 2. The forward compartment 60 can of course be configured in any way desired and that shown is merely representative of one configuration. The top surface of the access cover 64 is provided with an upholstered pad 68 having a top surface which is configured complimentary in shape with the forward portion of the drivers and passengers seat bottom 36, 38 at the gap 40 and, as stated above, abuts against the top cushion 34 on the seat frame 28 and fills the gap 40 The top surface of the padded cover 34 on the seat frame 28 portion of the first frame means and the top surface of the pad 68 on the access cover 64 portion of the second frame means form a substantially continuous external surface configuration in the fully retracted position of the compartment frame that is complimentary to and contiguous with the external surface configuration of each of the drivers and first passenger seats and form the second passengers seat bottom when retracted as shown in FIG. 6.

The rear compartment portion 62 of the compartment frame 44 is positioned within the interior of seat frame 28 in the retracted position. When extended, as shown in FIGS. 2 and 7, the rear compartment 62 is positioned externally of the seat frame between the open end of the seat frame and the forward compartment 60 providing for access to the rear compartment. The rear compartment 62 is shown as being a generally rectangular container for holding items such as, for example, cassette tapes, but it also may be of any other desired configuration.

Figure 3:
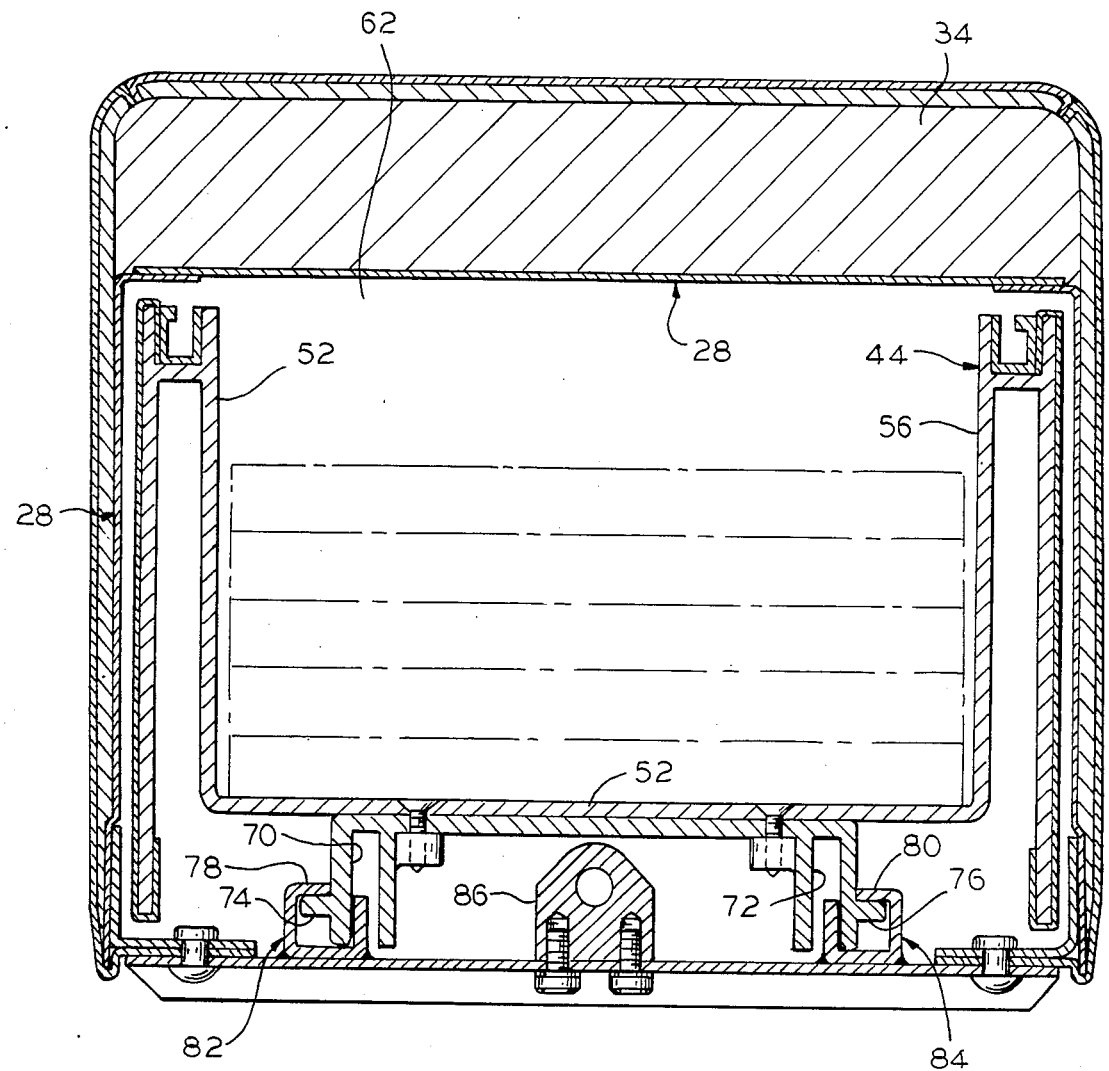
FIG. 3 is a transverse cross sectional view taken along the line 3—3 of FIG. 2 showing details of construction of the seat frame rear compartment portion and compartment frame and drive structure.

Referring to FIGS. 3 and 5, the compartment frame 44 is provided with a pair of channels 70, 72 on its external bottom surface on each of which are provided an outwardly extending projection 74, 76 received under flanges 78, 80 on a pair of tracks 82, 84 secured to the drivers seat mounting bracket 18 as shown in FIG. 4. It can be seen that the tracks 82, 84 allow the compartment frame 44 to slide forward and rearward between the extended and retracted positions.

Secured to the forward end of the seat frame is a lead screw mounting block 86 within which one end 88 of a lead screw 90 is rotatably journaled. The opposite end of the lead screw 90 is coupled to the output shaft 92 of the reversible motor 32 by way of a coupling 94. A nut 96 is threadedly received on the lead screw and is affixed to the bottom of the compartment frame. The motor 32 is operator controlled to rotate the lead screw and to cause the compartment frame to slide to the desired extended position whereat a console is formed or to the retracted position whereat the second passengers seat bottom is formed.

Having described the preferred embodiment of the invention, those skilled in the art having the benefit of that description and the accompanying drawings can readily devise other embodiments and modifications. Therefore, those other embodiments and modifications are to be considered to be within the scope of the appended claims.

What is claimed is:

1. A combination console and second passenger seat bottom for an automotive vehicle comprising:
   first frame means adapted to be mounted between a drivers seat and a first passenger seat for movement with at least a one of said drivers seat and said first passenger seat;
   second frame means mounted for selective movement between a fully retracted position in abutment with said first frame means and a fully extended position disposed spaced apart from said first frame means defining a console in the extended position, said first frame means and said second frame means defining a substantially continuous external surface configuration in said fully retracted position complimentary to and contiguous with the external surface configuration of each of said drivers seat and said first passenger seat, thereby defining a second passenger seat bottom between said drivers seat and said first passengers seat.

2. The combination console and seat bottom as defined in claim 1 wherein said second frame means includes a first portion defining a first compartment.

3. The combination console seat bottom as defined in claim 2 wherein said first frame means includes a hollow interior open on a front end thereof, and
   said second frame means includes a second portion defining a second compartment slidably received within said hollow interior through said open end.

4. The combination console and seat bottom as defined in claim 3 wherein said second compartment is disposed between the open end of said first frame means and said first compartment of said second frame means in the fully extended position of said second from means.

5. The combination console and seat bottom as defined in claim 1 including reversible motor driven means operatively connected to said second frame means providing for said selective movement of said second frame means.

6. The combination console and seat bottom as defined in claim 5 wherein said motor driven means includes:
   a reversible motor;

a lead screw connected for rotation by said motor;

a drive member on said lead screw connected to said second frame means; and track means connecting said first frame means and said second frame means for relative slidable movement.

7. A combination console and second passengers seat for an automotive vehicle comprising:

a seat frame adapted to be mounted between a drivers seat and a first passengers seat for movement with at least said drivers seat, said seat frame having a top exterior surface shape complimentary to the shape of a rear portion of a bottom part of each of said drivers seat and said first passengers seat, said seat frame further defining a hollow interior and being open at a forward end;

a compartment frame having a forward portion defining a first compartment and an adjacent rearward portion defining a second compartment, said forward portion having a top exterior surface contour substantially complimentary to the shape of a forward portion of said bottom part of each of said drivers seat and said first passengers seat; and means associated with said compartment frame providing for selective slidable movement of said compartment frame between a retracted position whereat said second compartment is positioned within said seat frame hollow interior with said first compartment against said seat frame at said open end with said top exterior surface of said seat frame and said compartment frame forward portion defining a substantially continuous, center, second passengers seat bottom between said first passengers seat and said drivers seat and a fully extended position whereat said forward compartment is disposed spaced apart from said open end of said seat frame with said second compartment positioned between said first compartment and said open end of said seat frame.

8. The combination console and second passengers seat as defined in claim 7 wherein the top external surface of said forward portion of said compartment frame defines an access cover to said first compartment.

9. The combination console and second passengers seat as defined in claim 7 wherein said means providing for said selective slidable movement comprises:

track means on said compartment frame;

a threaded lead screw including a mounting nut threadedly engaged thereon, said mounting nut affixed to said compartment frame; and a reversible motor coupled to said lead screw.

10. The combination console and second passengers seat as defined in claim 9 wherein said second compartment is normally open at the top thereof in the fully extended position of said compartment frame.

11. A combination console and second passengers seat comprising:

a seat frame adapted to be mounted between a drivers seat and a first passengers seat for movement with at least a one of said drivers seat and said first passengers seat, said seat frame being substantially hollow with an open front end and a padded top external surface configured substantially complimentary to and being continuous with a rear portion of the top surfaces of said drivers seat and said first passengers seat configuration ;

a compartment frame defining a forward compartment and a rear compartment, said forward compartment including a padded top access cover defining a top surface having a configuration substantially complimentary to the configuration of a front portion of the top surfaces of said driver seat and said first passengers seat; and means including track means associated with said compartment frame adapted to be affixed to said vehicle and a reversible motor operated lead screw including a mounting nut coupled to said compartment frame for selectively moving said compartment frame between a retracted position whereat said top surface of said forward compartment padded top access cover is disposed substantially contiguous with the top surface of said padded seat frame and with the top surface of said drivers seat and said first passengers seat with said second compartment disposed within said seat frame interior and an extended position whereat said second compartment is positioned externally of the seat frame between said seat frame open end and said first compartment.

* * * * *